United States Patent [19]

Ishimura

[11] Patent Number: 5,434,624
[45] Date of Patent: Jul. 18, 1995

[54] APPARATUS FOR PRODUCING A MULTI-SCENE VIDEO SIGNAL

[75] Inventor: Tuneaki Ishimura, Yokohama, Japan

[73] Assignee: Matsushita Electric Industrial Co., Ltd., Osaka, Japan

[21] Appl. No.: 183,954

[22] Filed: Jan. 19, 1994

[30] Foreign Application Priority Data

Jan. 29, 1993 [JP] Japan ................... 5-013052

[51] Int. Cl.⁶ ............................... H04N 5/45
[52] U.S. Cl. ...................... 348/563; 348/564
[58] Field of Search ................ 348/564-568, 348/588, 563; H04N 5/45, 5/262, 5/268, 5/445

[56] References Cited

U.S. PATENT DOCUMENTS

| | | | |
|---|---|---|---|
| 5,016,106 | 5/1991 | Yong-Je et al. | 348/565 |
| 5,040,067 | 8/1991 | Yamazaki | 348/567 |
| 5,130,801 | 7/1992 | Yamaguchi | 348/567 |
| 5,161,012 | 11/1992 | Choi | 348/564 |

OTHER PUBLICATIONS

M. Burkert, et al, "IC Set for a Picture-In-Picture System with On-Chip Memory", IEEE Transactions on Consumer Electronics, vol. 36, No. 1, Feb. 1990, pp. 23-31.

Primary Examiner—James J. Groody
Assistant Examiner—Michael H. Lee
Attorney, Agent, or Firm—Stevens, Davis, Miller & Mosher

[57] ABSTRACT

A multi-scene video signal producing apparatus in which a single large capacity memory is used for simultaneously displaying a plurality of scenes on respective regions formed by splitting one frame without requiring a plurality of memories for individual video signals so that the apparatus can be constituted by a small number of required component parts. The apparatus includes, in a stage preceding the memory into which a plurality of digital video input signals are written, data delay parts delaying the video input signals, data position detectors generating data position pulses together with address signals, address delay parts delaying the address signals, a memory synchronization pulse generator generating memory synchronization pulses, position detection/-holders detecting and holding the data positions on the basis of the data position pulses and the memory synchronization pulses, decoders decoding the output signals of the position detection/holders, and selectors selecting the delayed video signals and the delayed address signals according to signal decoded information from the decoders, so that the plural video input signals can be written in the single memory.

4 Claims, 4 Drawing Sheets

APPARATUS FOR PRODUCING A MULTI-SCENE VIDEO SIGNAL

BACKGROUND OF THE INVENTION

1. Field of the Invention

This invention relates to an apparatus for producing a multi-scene video signal consisting of a plurality of video signals having different synchronizations respectively so that a plurality of scenes provided by the respective video signals can be simultaneously displayed in one frame.

2. Description of the Related Art

The term "multi-scene video signal producing apparatus" used herein indicates such an apparatus which can produce a video signal for simultaneously displaying $N \times N$ scenes (where N is a factor splitting one frame in both the horizontal and vertical directions and is a positive integer larger than and including 2), or the term indicates such an apparatus which can produce a video signal for simultaneously displaying a plurality of scenes in a superposed relation in one frame. The basic principle of operation of the latter apparatus is the same as that of the former apparatus. Therefore, a multi-scene video signal producing apparatus in which the value of N is selected to be N=2 to produce a multi-scene video signal for simultaneously displaying four scenes when one frame is split into four regions will be described by way of example.

FIG. 6 shows schematically the structure of a prior art multi-scene video signal producing apparatus. Referring to FIG. 6, digital video input signals 50, 51, 52 and 53 applied with timing of respectively different phases or frequencies are connected to memories 54, 55, 56 and 57 storing data corresponding to ¼ of one frame respectively. The video input signals 50 to 53 compressed in their scene sizes to ¼ of one frame respectively are written in the memories 54 to 57 with their phases or frequencies synchronized with the input timing respectively. Then, with the read timing that does not coincide with the write timing, the memories 54 to 57 are changed over to read out the data composing one frame size, so that a multi-scene video signal including four scenes in one frame appears at an output terminal 58 of the apparatus. Thus, the write timing and the read timing for each of the memories 54 to 57 differ in the phase or frequency.

However, when a single memory having a capacity large enough for storing all of the four scenes is used in the prior art multi-scene video signal producing apparatus, the four video input signals must be written in the large capacity memory with a plurality of timings having different phases or frequencies respectively, and the stored data must then be read out from the memory with read timings different from the write timings respectively, resulting in complexity of the memory read/write access timing. After all, such a large capacity memory could not be used in the prior art apparatus.

According to another method proposed hitherto, four or more small capacity memories are used to provide four blocks similar to the aforementioned memories 54 to 57, and each video input signal is allotted to one block. However, the above proposal has been defective in that the memory costs inevitably increase, and the number of required parts also inevitably increases due to the fact that a large capacity memory having a low bit cost cannot be used. Also, in the case of displaying multiple scenes in one frame split into, for example, nine or sixteen regions, it is necessary to use at least nine or sixteen memories although their capacity is relatively small. The problems pointed out above are thus quite serious.

SUMMARY OF THE INVENTION

With a view to solve the prior art problems pointed out above, it is an object of the present invention to provide a multi-scene video signal producing apparatus which is inexpensive and requires a small number of component parts because of employment of a method in which application timing of each of a plurality of video input signals having different synchronizations is adjusted so as to write the input signals in a single large capacity memory, and the stored data are read out from the memory with timing different from the write timing.

An embodiment of the multi-scene video signal producing apparatus according to the present invention which attains the above object comprises, in a stage preceding a memory into which individual video input signals are written, delay circuits for delaying the video input signals and addresses corresponding to the individual video input signals respectively, selectors for selecting the delayed video signals and the delayed addresses respectively, position detection/holding circuits for detecting the data positions in the delayed video signals respectively and holding the data position information, and decoders for converting the data position information held in the position detection/holding circuits into a form suitable for selection by the selectors respectively, the outputs of the decoders being used for selective change-over of the data and address selectors so as to write the video input signals according to the outputs of the selectively changed over data and address selectors.

Therefore, according to the present invention, the positions of individual data are detected on the basis of both data position pulses synchronous with the individual video input signals respectively and memory synchronization pulses synchronous with memory drive pulses, and, on the basis of the result of decoding the data position detection signals, the delayed video input signals and the corresponding delayed addresses are selected by the selectors, so that the video input signals having different synchronizations are converted into the form that can be synchronized with the read timing. Thus, a plurality of video input signals can be written in a single large capacity memory, so that a multi-scene video signal producing apparatus which is inexpensive and requires a small number of component parts can be provided.

DESCRIPTION OF THE PREFERRED EMBODIMENTS

Figure 1:
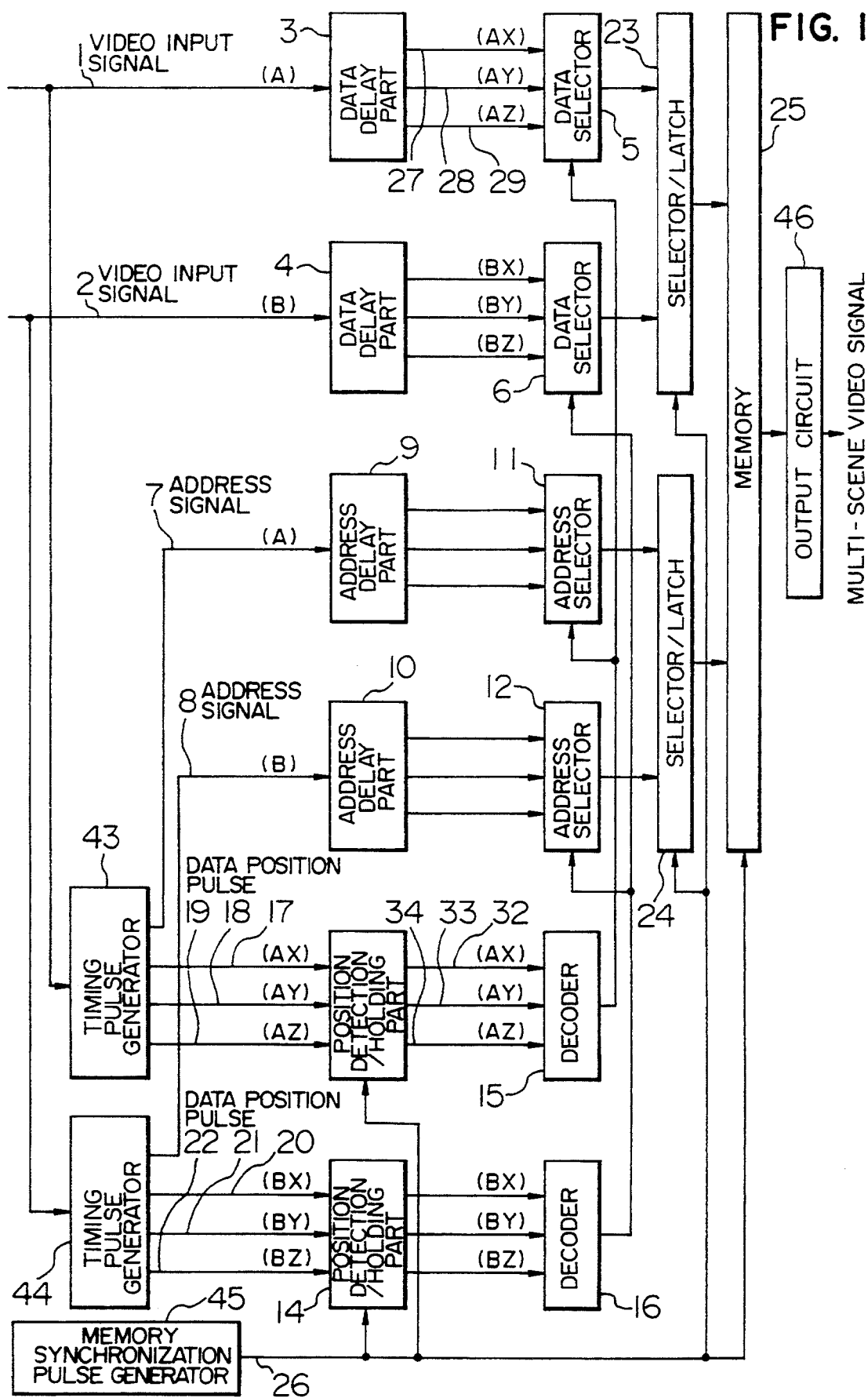
FIG. 1 is a schematic block diagram showing the structure of an embodiment of the multi-scene video signal producing apparatus according to the present invention.
Figure 2:
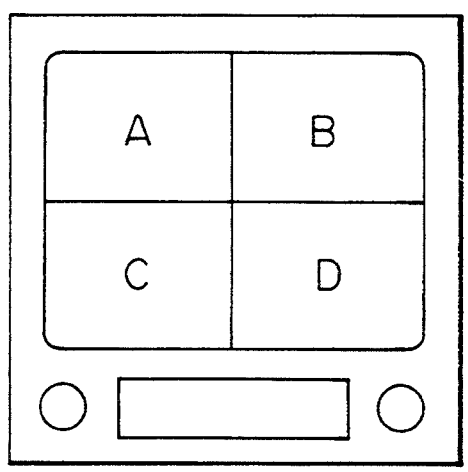
FIG. 2 shows that one frame is split into four regions for displaying four scenes respectively.

FIG. 1 shows the structure of an embodiment of the multi-scene video signal producing apparatus according to the present invention. FIG. 1 shows only those circuits required for producing such a video signal for displaying scenes on upper half regions A and B of one frame when one frame is split into four regions A, B, C and D as shown in FIG. 2. In FIG. 1, two video input signals for displaying scenes on the upper half regions A and B respectively are connected to a single memory 25. The structure of the circuits for displaying scenes on the lower half regions C and D are similar to those illustrated, so that any detailed description of the latter circuits will be unnecessary.

Referring to FIG. 1, two digital video input signals 1 and 2 having different phases or frequencies with respect to their data timing are connected to data delay parts 3 and 4 respectively, and a plurality of sets of delayed video signals corresponding to the delay times of the data delay parts 3 and 4 appear at the outputs of the data delay parts 3 and 4 to be connected to data selectors 5 and 6 respectively. Address signals 7 and 8 corresponding to the digital video input signals 1 and 2 are produced by timing pulse generators 43 and 44 on the basis of the video input signals 1 and 2 respectively. The address signals 7 and 8 are connected to address delay parts 9 and 10 respectively, and a plurality of sets of delayed address signals corresponding to the delay times of the address delay parts 9 and 10 appear at the outputs of the address delay parts 9 and 10 to be connected to address selectors 11 and 12 respectively. Further, on the basis of the video input signal 1, the timing pulse generator 43 produces data position pulses 17, 18 and 19 representing the data positions in the delayed video signals. These data position pulses 17 to 19 are connected to a position detection/holding part 13, and corresponding output signals 32, 33 and 34 of the position detection/holding part 13 are connected to a decoder 15. Similarly, on the basis of the video input signal 2, the timing pulse generator 44 produces data position pulses 20, 21 and 22 representing the data positions in the delayed video signals. These data position pulses 20 to 22 are connected to a position detection/holding part 14, and corresponding output signals of the position detection/holding part 14 are connected to a decoder 16. On the basis of output signals appearing from the respective decoders 15 and 16, each of the data selectors 5 and 6 selects one of the delayed video signals from the corresponding set of the delayed video signals to apply the selected delayed video signal to a selector/latch 23. The selector/latch 23 selects one of the input signals and applies the selected signal to a data input terminal of the memory 25. Similarly, on the basis of the output signals appearing from the decoders 15 and 16, each of the address selectors 11 and 12 selects one of the delayed address signals from the corresponding set of the delayed address signals to apply the selected delayed address signal to a selector/latch 24. The selector/latch 24 selects one of the input signals and applies the selected signal to an address terminal of the memory 25.

The video data stored in the memory 25 are then read out to appear as the multi-scene video signal from an output circuit 46.

Figure 3:
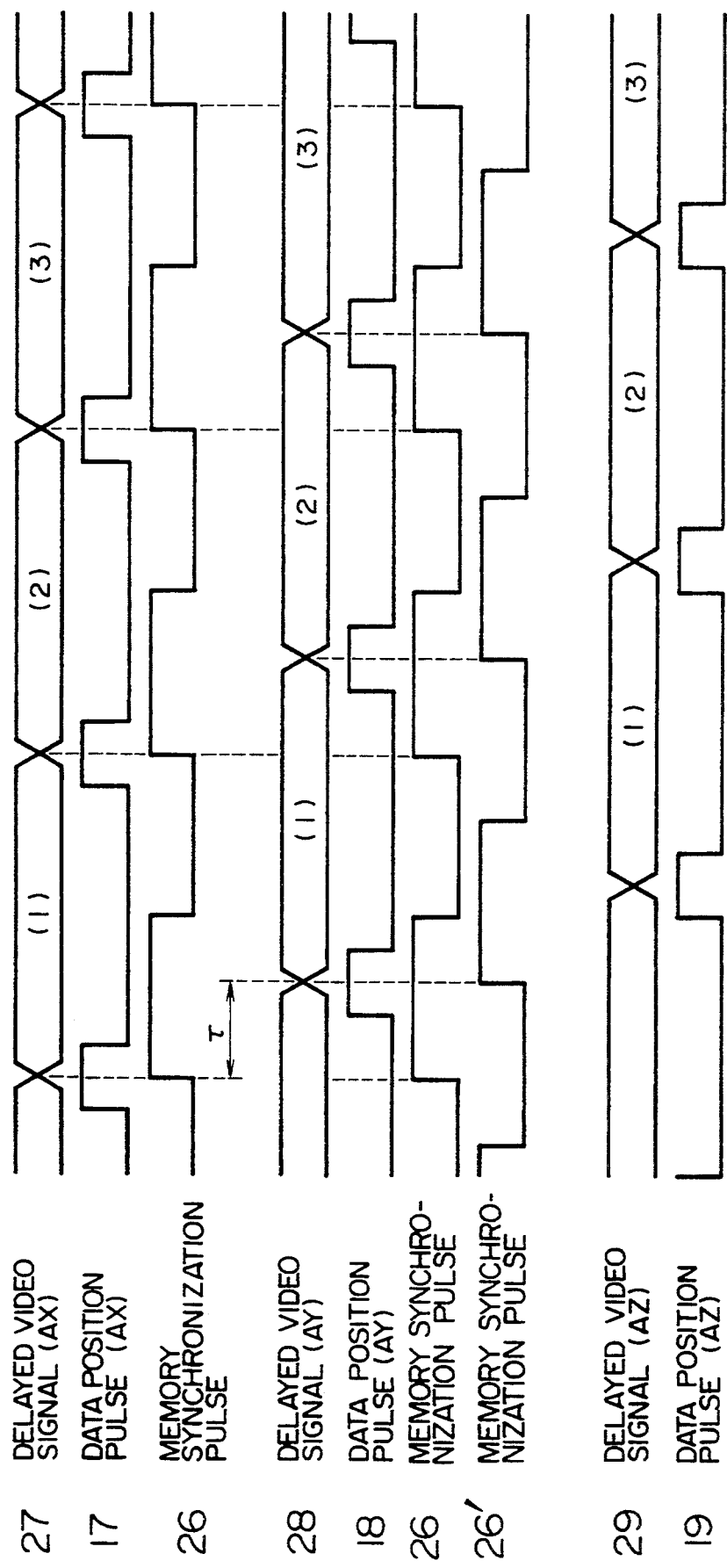
FIG. 3 is a timing chart showing, by way of example, the timing of the video signals, that of the data position pulses and that of the memory synchronization pulses in the embodiment shown in FIG. 1.

The operation of the embodiment of the present invention will now be described. The digital video input signal 1 applied to the data delay part 3 is delayed with timing as shown in FIG. 3, and the resultant delayed video signals 27, 28 and 29 are inputted to the data selector 5. Similarly, as in the case of the digital video input signal 1, the digital video input signal 2 applied to the data delay part 4 is also delayed, and the resultant delayed video signals are inputted to the data selector 6. Each of data (1), (2) and (3) shown in FIG. 3 corresponds to one picture element or a plurality of picture elements, and the delay time $\tau$ is equal to the period of a ¼ picture element or a plurality of picture elements. The address signals 7 and 8 corresponding to the video input signals 1 and 2 are delayed by the address delay parts 9 and 10 by the same amount as that for the video input signals 1 and 2 and are inputted to the address selectors 11 and 12 respectively.

Figure 4:
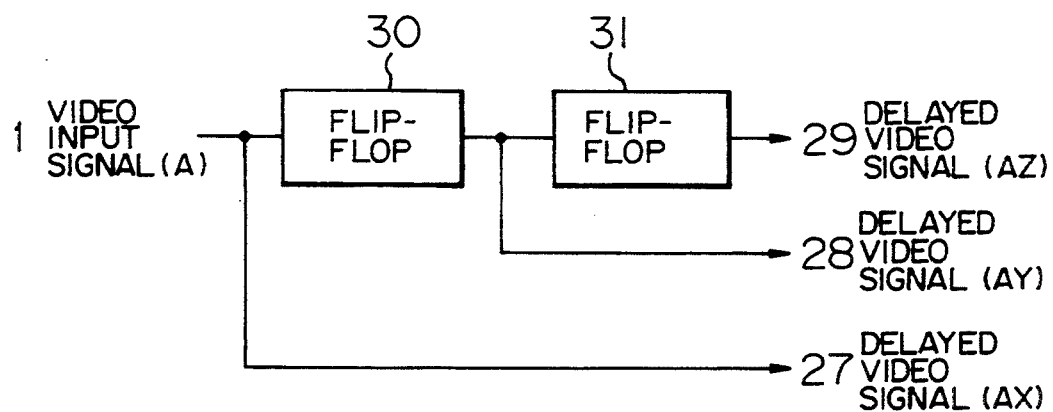
FIG. 4 is a block diagram showing in detail the structure of the data delay part in the embodiment shown in FIG. 1.

FIG. 4 is a block diagram showing in detail the structure of the data delay part 3. Referring to FIG. 4, the data delay part 3 consists of two flip-flops 30 and 31 whose delay time is $\tau$, so that the three delayed video signals 27 to 29 appear when the video input signal 1 is inputted to the data delay part 3. The data delay part 4 and the address delay parts 9, 10 have a structures similar to that of the data delay part 3. When more than three delayed output signals are required, this requirement can be dealt with by increasing the number of the flip-flops connected in cascade.

The data position pulses 17 to 19 corresponding to the delayed video signals 27 to 29 respectively indicate the period where the data is stable. Therefore, in the period where each of the data position pulses 17 to 19 is in its "H" level as shown in FIG. 3, the corresponding delayed video signal is changing and unstable. On the other hand, in the period where each of the data position pulses 17 to 19 is in its "L" level, the corresponding delayed video signal is stable. The period where the data position pulses 17 to 19 are in their "H" level is determined by taking into consideration the data changing period, the set-up time as well as the hold time of each of the selector/latches 23 and 24, etc., and the data position pulses 17 to 19 are used to detect the relation between the phase of the video input signals and that of memory synchronization pulses 26 generated from a memory synchronization pulse generator circuit The position detecting operation will now be described. In synchronism with the leading edge of the memory synchronization pulse 26, the selector/latch 23 fetches the delayed video signals. When, in this case, each of the data position pulses are in its "L" level at the time corresponding to the leading edge of the corresponding memory synchronization pulse 26, the data is directly latched by the selector/latch 23. However, when the relation among the phase of the delayed video signal 27, that of the data position pulse 17 and that of the memory synchronization pulse 26 is as shown in FIG. 3, the data cannot be stably latched. Therefore, on the basis of the detected data 32 to 34 produced in the position detection/holding part 13 on the basis of the data position pulses 17 to 19 and the memory synchronization pulses 26, the decoder 15 produces a control signal for controlling the data selector 5, and, according to this control signal, the data selector 5 selects one of the delayed video signals, that is, the delayed video signal 28 conforming to the timing of the memory synchronization pulse 26 from the set of the delayed video signals. Similarly, the address selector 11 selects one of the delayed address signals, that is, the delayed address signal corresponding to the delayed video signal 28 from the set of the delayed address signals. By the above manner of operation, the delayed video signal 27 is delayed by the time $\tau$ to provide the delayed video signal 28 that can be stably fetched by the selector/latch 23 in synchronism with the memory synchronization pulse 26.

A change in the relation between the phase or frequency of each of the video input signals 1, 2 and that of the memory synchronization pulses 26 may result in the relation between the phase of the data position pulse 18 and that of a memory synchronization pulse 26' as shown in FIG. 3. In such a situation, on the basis of the detected data 32 to 34 appearing from the position detection/holding part 13, the data selector 5 selects the delayed video signal 29 according to the control signal outputted from the decoder 15. In conformity with the change-over of the delayed video signal, the delayed address signal is similarly changed over by the address selector 11.

Figure 5:
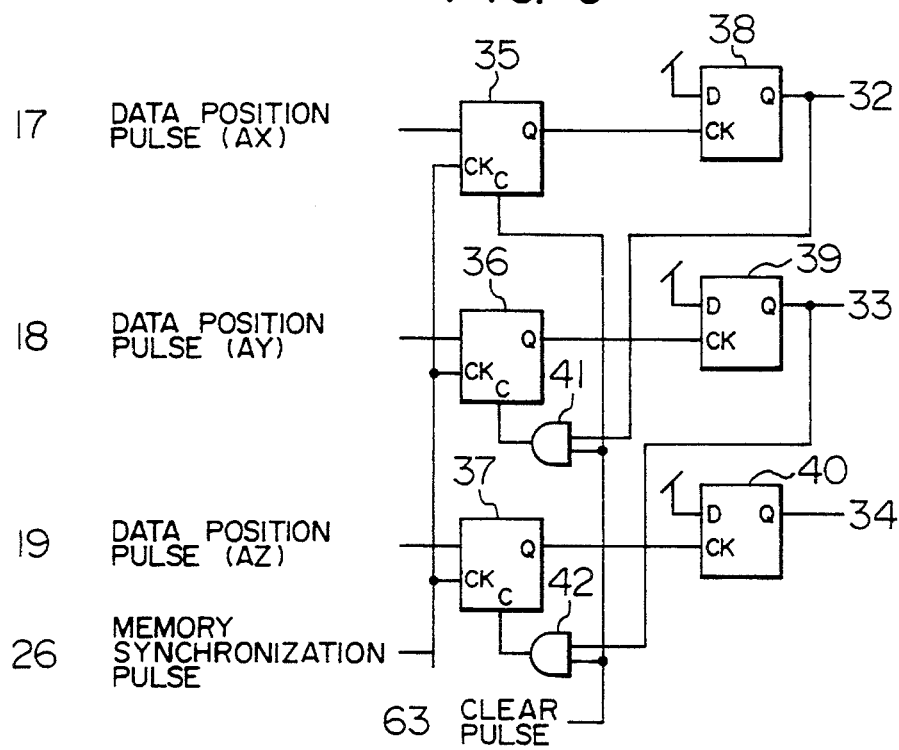
FIG. 5 is a circuit diagram showing in detail the structure of the data position detection/holding part in the embodiment shown in FIG. 1.
Figure 6:
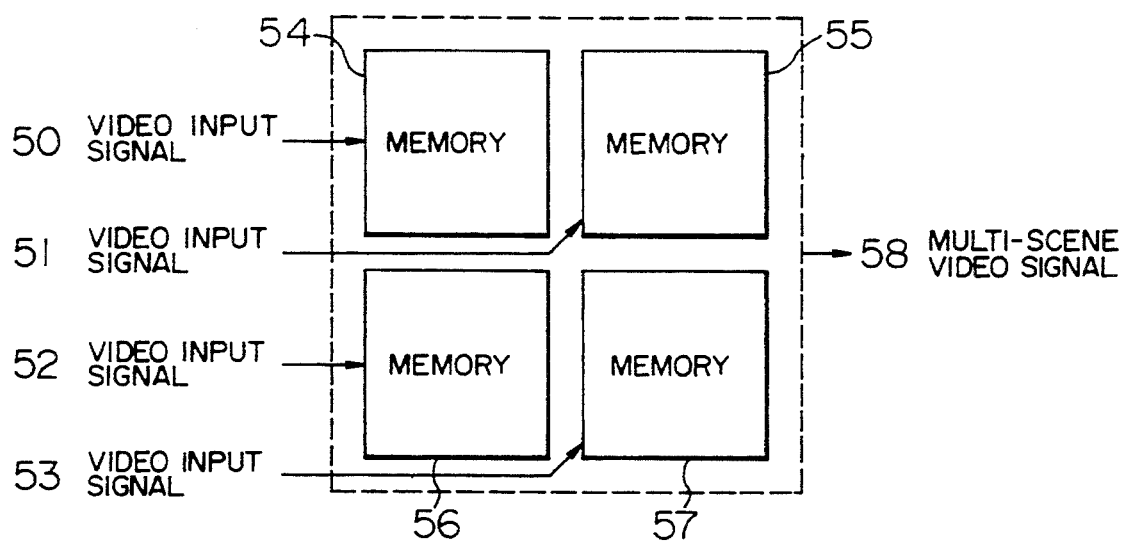
FIG. 6 is a schematic block diagram showing the structure of a prior art multi-scene video signal producing apparatus.

FIG. 5 is a circuit diagram showing in detail the structure of the position detection/holding part 13. Referring to FIG. 5, the position detection/holding part 13 consists of a plurality of flip-flops 35, 36, 37, 38, 39, 40 and a plurality of AND gates 41, 42, and a clear pulse 63 resets the operation of the flip-flops 35, 36 and 37 with a suitable period, for example, that of the horizontal synchronizing signal. The circuit structure of the position detection/holding part 14 is similar to that shown in FIG. 5.

According to the embodiment of the present invention described above, the data positions in the video input signals 1 and 2 are detected on the basis of the combination of the data position pulses 17, 18, 19 and the memory synchronization pulses 26, and the combination of the data position pulses 20, 21, 22 and the memory synchronization pulses 26, respectively. On the basis of the data position detection signals, the delayed video signals and the delayed address signals synchronous with the clock driving the memory 25 are selected by the data selectors 5, 6 and the address selectors 11, 12, respectively. That is, because the plural video input signals 1 and 2 having different synchronizations are converted into the data synchronous with the clock driving the memory 25, so that the data included in the video input signals 1 and 2 can be written in the single memory 25.

Although the aforementioned embodiment of the present invention has referred to the case where the two video input signals 1 and 2 are applied to the apparatus, it is apparent that the number of the video input signals may be more than two. In such a case, the effect similar to that described above can be exhibited when the number of the data delay parts, that of the data selectors, that of the address delay parts, that of the address selectors, that of the position detection/holding parts and that of the decoders are selected to be more than two. When, for example, one frame is split into nine regions for displaying nine scenes, nine video input signals are applied, and nine circuits corresponding to the nine inputs respectively are prepared.

It will be apparent from the foregoing description of the preferred embodiment of the present invention that data positions in a plurality of input signals are detected on the basis of the combination of data position pulses and memory synchronization pulses, and the input signals and the corresponding addresses conforming to the timing of a clock driving a memory are selected by associated data and address selectors respectively. Thus, because the plural input signals can be written in a single memory, a large capacity memory can be used. Therefore, the present invention can provide a useful multi-scene video signal producing apparatus that is inexpensive and requires a small number of component parts.

I claim:

1. A multi-scene video signal producing apparatus which, in response to the application of a plurality of digital video input signals belonging to a plurality of channels respectively, produces a multi-scene video signal so that a plurality of scenes provided by the video input signals can be simultaneously displayed on a plurality of regions formed by splitting one frame respectively, comprising:

a memory for storing at least part of said video signals;

a memory synchronization pulse generator circuit for generating memory synchronization pulses for driving said memory;

data delay parts of said plurality of channels each delaying one of said video signals thereby producing a set of video signals having a time difference between them;

timing pulse generators of said plurality of channels, each producing an address signal used at the time of storing one of said video signals in said memory and producing a set of data position pulses indicating information regarding change points of the data included in one of said video signals;

address delay parts of said plurality of channels, each delaying said address signal thereby producing a set of address signals having a time difference between them and corresponding to the set of said video signals;

position detection/holding means of said plurality of channels, each producing a set of detected data indicative of whether or not the timing of the set of said data position pulses conforms to that of said memory synchronization pulses respectively;

decoders of said plurality of channels, each determining a suitable one of the set of said delayed video signals to be selected on the basis of the set of said detected data;

data selectors of said plurality of channels, each selecting one delayed video signal from the set of said delayed video signals according to the output signal of one of said decoders;

address selectors of said plurality of channels, each selecting one address signal from the set of said address signals according to the output signal of one of said decoders;

selective data latch means for selecting to latch one of the output signals of said plural channel data selectors and supplying the selected signal to said memory according to the timing of said memory synchronization pulses;

selective address latch means for selecting to latch one of the output signals of said plural channel address selectors and supplying the selected signal to said memory according to the timing of said memory synchronization pulses; and output means for outputting said video data stored in and read out from said memory.

2. An apparatus according to claim 1, wherein said memory has a capacity large enough for storing video data corresponding to one field.

3. An apparatus according to claim 1, wherein each of said data delay parts and said address delay parts acts to generate an output signal that is its input signal itself, an output signal obtained by delaying the input signal by a predetermined delay time $\tau$ and an output signal obtained by delaying the input signal by a delay time $2\tau$.

4. An apparatus according to claim 3, wherein said predetermined delay time $\tau$ is longer than the period of $\frac{1}{4}$ of one picture element but shorter than the period of a plurality of consecutive picture elements.

* * * * *